United States Patent
Schmidt et al.

(10) Patent No.: US 9,506,780 B2
(45) Date of Patent: Nov. 29, 2016

(54) SENSOR BEARING ASSEMBLY

(71) Applicants: Klemens Schmidt, Gerbrunn (DE); Jan Doornenbal, Harmelen (NL)

(72) Inventors: Klemens Schmidt, Gerbrunn (DE); Jan Doornenbal, Harmelen (NL)

(73) Assignee: AKTIEBOLAGET SKF, Gothenburg (SE)

( * ) Notice: Subject to any disclaimer, the term of this patent is extended or adjusted under 35 U.S.C. 154(b) by 233 days.

(21) Appl. No.: 14/368,142

(22) PCT Filed: Dec. 21, 2012

(86) PCT No.: PCT/EP2012/005332
§ 371 (c)(1),
(2) Date: Jun. 23, 2014

(87) PCT Pub. No.: WO2013/091888
PCT Pub. Date: Jun. 27, 2013

(65) Prior Publication Data
US 2015/0107380 A1    Apr. 23, 2015

(30) Foreign Application Priority Data
Dec. 23, 2011   (EP) .................. PCT/EP2011/006539

(51) Int. Cl.
*G01D 5/00* (2006.01)
*G01P 1/00* (2006.01)
(Continued)

(52) U.S. Cl.
CPC ............... *G01D 11/02* (2013.01); *F16C 19/52* (2013.01); *G01P 1/026* (2013.01); *G01P 3/443* (2013.01); *G01D 5/145* (2013.01)

(58) Field of Classification Search
CPC ........ G01D 11/02; G01D 5/00; G01D 5/145; G01P 1/00; G01P 1/026; G01P 3/00; G01P 3/443; G01L 15/00
See application file for complete search history.

(56) References Cited

U.S. PATENT DOCUMENTS

| 5,918,194 A | 6/1999 | Banaska et al. |
|---|---|---|
| 6,161,962 A | 12/2000 | French et al. |

(Continued)

FOREIGN PATENT DOCUMENTS

| JP | 2006058162 A | * | 3/2006 | ............... G01L 5/00 |

OTHER PUBLICATIONS

Gaberson H.A, "Rotating machinery energy loss due to misalignment," Energy Conversion Engineering Conference, Aug. 11, 1996, 1809-1812, vol. 3, Proceedings of the 31st Intersociety Washington, DC, USA.

(Continued)

Primary Examiner — Nguyen Ha
(74) Attorney, Agent, or Firm — Bryan Peckjian; SKF USA Inc. Patent Dept.

(57) ABSTRACT

A sensor bearing assembly having a rolling element bearing and at least one sensor is provided. The rolling element bearing includes an inner ring, an outer ring, and rolling elements arranged between the inner ring and the outer ring. The at least one sensor is arranged to convert one or more physical magnitudes to electrical sensor signals. The sensor is attached directly or indirectly to the rolling element bearing. The assembly further comprises a converter unit. The converter unit is arranged to convert the electrical sensor signals to output signals, the output signals are different to in type, form and/or amplitude in relation to the electrical sensor signals. The converter unit is also disposed in a separate enclosure that does not share the same enclosure with the sensor.

8 Claims, 6 Drawing Sheets

(51) Int. Cl.
*G01P 3/00* (2006.01)
*G01L 5/00* (2006.01)
*F16C 19/00* (2006.01)
*G01D 11/02* (2006.01)
*G01P 1/02* (2006.01)
*G01P 3/44* (2006.01)
*F16C 19/52* (2006.01)
*G01D 5/14* (2006.01)

(56) References Cited

U.S. PATENT DOCUMENTS

| | | | |
|---|---|---|---|
| 2004/0122604 A1* | 6/2004 | Gelsomino | G01M 13/028 |
| | | | 702/56 |
| 2007/0056004 A1 | 3/2007 | Rose et al. | |
| 2010/0264908 A1* | 10/2010 | Paxton | G01P 3/489 |
| | | | 324/173 |
| 2011/0298626 A1* | 12/2011 | Fechalos | H01M 10/482 |
| | | | 340/664 |
| 2013/0291657 A1* | 11/2013 | Purekar | G01L 3/101 |
| | | | 73/862.333 |

OTHER PUBLICATIONS

Veale K.L. et al, "Efficiency management within an industrial environment," Industrial Engineering and Engineering Management (IE&EM), Sep. 3, 2011, 1859-1863, 2011 IEEE 18th International Conference on, IEEE.

* cited by examiner

PRIOR ART

SENSOR BEARING ASSEMBLY

CROSS-REFERENCE

This application is the U.S. National Stage of International Application No. PCT/EP2012/005332 filed on Dec. 21, 2012, which claims priority to International Application No. PCT/EP2011/006539 filed on Dec. 23, 2011.

TECHNICAL FIELD

The invention concerns sensor bearing assemblies and is more particularly directed to rolling element bearings comprising one or more sensors and their interface.

BACKGROUND

A rolling element bearing comprises an inner ring, an outer ring and several rolling elements or bodies installed between these two rings. These rolling elements can be balls, rollers or needles. In the meaning of the invention, a rolling bearing and a rolling element bearing can be, for instance, a ball bearing, a roller bearing or a needle bearing.

In the field of rolling element bearings, it is known to attach one or more sensors to measure one or more physical parameters and transduce these physical parameters into electrical signals. One such example is the use of a tachometer in order to determine the rotation speed of a member supported by a rolling bearing. For instance, truck lifts are equipped with electric motors to move upwardly of downwardly the forks of the truck. The position and speed of the forks can be controlled for safety reasons. In this context, it is known to use an instrumented rolling element bearing assembly in order to support a rotating shaft of an electric motor with respect to a frame and to provide a variable-voltage regulator with some information with respect to a rotation parameter of the rotating shaft. Such an instrumented rolling bearing assembly includes a sensor, in the form of an electronic component such as a Hall-effect cell, and possibly some other electronic components for the treatment of the output signal of such a sensor. There is still room for improvements.

SUMMARY

An object of the invention is to define a manner to create a flexible sensor bearing assembly.

The aforementioned object is achieved according to the invention by a converter unit. The converter unit is arranged to convert electrical sensor signals to output signals, the output signals are different to form, type and/or amplitude in relation to the electrical sensor signals. The converter unit is also enclosed in a separate enclosure, that is the converter unit does not share a housing/enclosure with the sensor, the converter unit is housed in its own enclosure.

In some embodiments for the electrical sensor signals, the converter unit is electrically coupled with the sensor by means of an electrical cable. In other embodiments for the electrical sensor signals, the converter unit is electrically coupled with the sensor by means of matching coded detachable connectors, a sensor side coded connector and a converter unit input side coded connector. The coding being a physical coding, such as matching male/female connectors. The coded connectors can be coded as to what type of signals are delivered and expected, that is different physical characteristics in dependence on the type of signal. For the electrical sensor signals, the converter unit can further be electrically coupled with the sensor by means of an electrical cable between sensor and sensor side coded connector and/or between the converter unit and the converter unit input side coded connector. In some embodiments the converter unit side coded connector is integrated with the separate enclosure of the converter unit. The enclosure itself can then in some embodiments be part of the coding, that is the physical shape of the enclosure allowing only matching connectors.

Sometimes for the output signals the, converter unit is electrically coupled with other equipment by means of an electrical cable. In other embodiments for the output signals, the converter unit is electrically coupled with other equipment by means of matching coded detachable connectors, another equipment side coded connector and a converter unit output side coded connector. The converter unit can further be electrically coupled with the other equipment by means of an electrical cable between the other equipment and other equipment side coded connector and/or between the converter unit and the converter unit output side coded connector. Or the converter unit side coded connector can be integrated with the separate enclosure of the converter unit. In such cases it can be advantageous that also the enclosure shape is part of the coding.

Suitably the converter unit further comprised power supply conditioning means. Such conditioning means can comprise power supply conversion and/or electrical interference filtering means.

In some embodiments the converter of the converter unit converts analog sensor signals to digital sensor signals or converts digital sensor signals to other digital sensor signals. In other embodiment the converter of the converter unit converts digital sensor signals to analog output signals.

In some versions the converter of the converter unit linearizes the sensor signals, that is goes from a non-linear sensor output to a linear output signal. The linearization can then be done by means of a transfer function and/or look-up table. Likewise in some versions of the converter can de-linearize a linear signal if the sensor signals are linear and a non-linear output is desired, this can also according to the invention be by means of a transfer function and/or look-up table.

The different additional enhancements of the converter unit/dongle according to the invention can be combined in any desired manner as long as no conflicting features are combined.

The aforementioned object is also achieved according to the invention by a power supply conditioning/converter unit/dongle. The power converter unit is arranged to convert/condition an available power supply to a power supply suitable for a sensor unit of a sensor bearing unit. The power supply conditioning/converter unit/dongle comprises power supply conversion and/or electrical interference filtering means. The power supply converter unit is enclosed in a separate enclosure, that is the power supply converter unit does not share a housing/enclosure with the sensor, the power supply converter unit is housed in its own enclosure.

In some embodiments for the power supply to the sensor, the power supply converter unit is electrically coupled with the sensor by means of an electrical cable. In other embodiments for the power supply to the sensor, the converter unit is electrically coupled with the sensor by means of matching coded detachable connectors, a sensor side coded connector and a power supply converter unit input side coded connector. The coding being a physical coding, such as matching male/female connectors. The coded connectors can be coded as to what type of power supply is delivered and expected, that is different physical characteristics in dependence on the type of power supply. The power supply unit can further be electrically coupled with the sensor by means of an electrical cable between sensor and sensor side coded connector and/or between the power supply converter unit and the power supply converter unit input side coded connector. In some embodiments the power supply converter unit side coded connector is integrated with the separate enclosure of the power supply converter unit. The enclosure itself can then in some embodiments be part of the coding, that is the physical shape of the enclosure allowing only matching connectors.

Suitably the power supply converter unit also provides pass through for the sensor signals. Sometimes the power supply converter unit is electrically coupled with other equipment by means of an electrical cable. In other embodiments the power supply converter unit is electrically coupled with other equipment by means of matching coded detachable connectors, an other equipment side coded connector and a power supply converter unit side coded connector. The power supply converter unit can further be electrically coupled with the other equipment by means of an electrical cable between the other equipment and other equipment side coded connector and/or between the power supply converter unit and the power supply converter unit side coded connector. Or the power supply converter unit side coded connector can be integrated with the separate enclosure of the power supply converter unit. In such cases it can be advantageous that also the enclosure shape is part of the coding.

The different additional enhancements of the power supply converter unit according to the invention can be combined in any desired manner as long as no conflicting features are combined.

The aforementioned object is also achieved according to the invention by a sensor bearing assembly comprising a rolling element bearing and at least one sensor. The rolling element bearing comprises an inner ring, an outer ring, and rolling elements arranged between the inner ring and the outer ring. The at least one sensor is arranged to convert one or more physical magnitudes to electrical sensor signals. The sensor is attached directly or indirectly to the rolling element bearing. According to the invention the assembly further comprises a converter unit. The converter unit is arranged to convert the electrical sensor signals to output signals, the output signals are different to form, type and/or amplitude in relation to the electrical sensor signals. The converter unit is also enclosed in a separate enclosure, that is the converter unit does not share a housing/enclosure with the sensor, the converter unit is housed in its own enclosure.

In some embodiments for the electrical sensor signals, the converter unit is electrically coupled with the sensor by means of an electrical cable. In other embodiments for the electrical sensor signals, the converter unit is electrically coupled with the sensor by means of matching coded detachable connectors, a sensor side coded connector and a converter unit input side coded connector. The coding being a physical coding, such as matching male/female connectors. The coded connectors can be coded as to what type of signals are delivered and expected, that is different physical characteristics in dependence on the type of signal. For the electrical sensor signals, the converter unit can further be electrically coupled with the sensor by means of an electrical cable between sensor and sensor side coded connector and/or between the converter unit and the converter unit input side coded connector. In some embodiments the converter unit side coded connector is integrated with the separate enclosure of the converter unit. The enclosure itself can then in some embodiments be part of the coding, that is the physical shape of the enclosure allowing only matching connectors.

Sometimes for the output signals the, converter unit is electrically coupled with other equipment by means of an electrical cable. In other embodiments for the output signals, the converter unit is electrically coupled with other equipment by means of matching coded detachable connectors, an other equipment side coded connector and a converter unit output side coded connector. The converter unit can further be electrically coupled with the other equipment by means of an electrical cable between the other equipment and other equipment side coded connector and/or between the converter unit and the converter unit output side coded connector. Or the converter unit side coded connector can be integrated with the separate enclosure of the converter unit. In such cases it can be advantageous that also the enclosure shape is part of the coding.

Suitably the converter unit further comprised power supply conditioning means. Such conditioning means can comprise power supply conversion and/or electrical interference filtering means.

In some embodiments the converter of the converter unit converts analog sensor signals to digital sensor signals. In other embodiment the converter of the converter unit converts digital sensor signals to analog output signals.

In some versions the converter of the converter unit linearizes the sensor signals, that is goes from a non-linear sensor output to a linear output signal. The linearization can then be done by means of a transfer function and/or look-up table. Likewise in some versions of the converter can de-linearize a linear signal if the sensor signals are linear and a non-linear output is desired, this can also according to the invention be by means of a transfer function and/or look-up table.

The different additional enhancements of the sensor bearing assembly according to the invention can be combined in any desired manner as long as no conflicting features are combined.

A primary purpose of the invention is to provide a means to be able to adapt a sensor bearing assembly to different requirements as to what is delivered as output signals and also to be able to adapt to different requirements as to what connectors are used and for example what type of power is delivered. This is obtained according to the invention by having a converter unit in a separate enclosure, in a dongle. And to ensure that the correct dongle is used to be able to code the connector of the dongle to only match connectors that match the electrical characteristics of the dongle/converter unit, the sensor, and the environment/other equipment that the sensor bearing assembly is intended to be connected to. In some embodiments the signal conversion and power are separated into two different dongles, each with their own enclosure, and suitably their own coded connections. Other advantages of this invention will become apparent from the detailed description.

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the method and device according to the invention, some examples of its use will now be described in connection with FIGS. 1 to 10.

Figure 1:
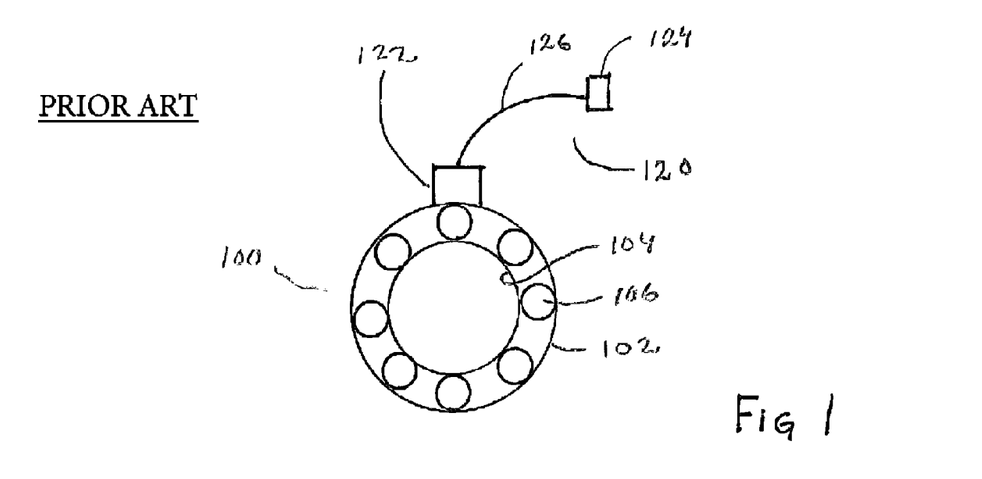
FIG. 1 illustrates an instrumented rolling element bearing.

FIG. 1 illustrates a conventional instrumented rolling element bearing 100 with an outer ring 102, rolling elements 106, an inner ring 104 and a sensor arrangement 120. A sensor arrangement 120 will comprise at least one sensor unit 122 that will deliver its output through a connector 124 via a cable 126. If the sensor unit 122 is active then it will most likely receive any necessary required power through the connector 124 as well. The sensor output through connector 124 will be supplied to other equipment/units that will use this output/information for determining one or more parameters of the bearing 100. These parameters may be one or more of temperature, speed, acceleration, vibration, load, strain of different parts of the instrumental bearing 100 or unit/parts connected to the instrumental bearing 100. Interfacing the instrumented bearing 100 to other equipment/units requires careful attention. For example, if it is a question of rotational speed of an attached shaft, then the sensor 122 might deliver a number of pulses per rotation. Some other equipment/units that the instrumented bearing 100 is intended to be coupled through the connector 124 which other equipment/units might for example, in some cases expect a 4 to 20 mA linear signal, and in other cases, a pulse width modulated 12 Volt signal. This would require two different sensor units 122, one that comprises electronics to generate the 4 to 20 mA linear signal and another that comprises electronics to generate the pulse width modulated 12 Volt signal. As the sensor unit 122 is closely integrated with the instrumented bearing, this means that two different instrumented bearings need to be manufactured and stocked. Not optimal.

Figure 2:
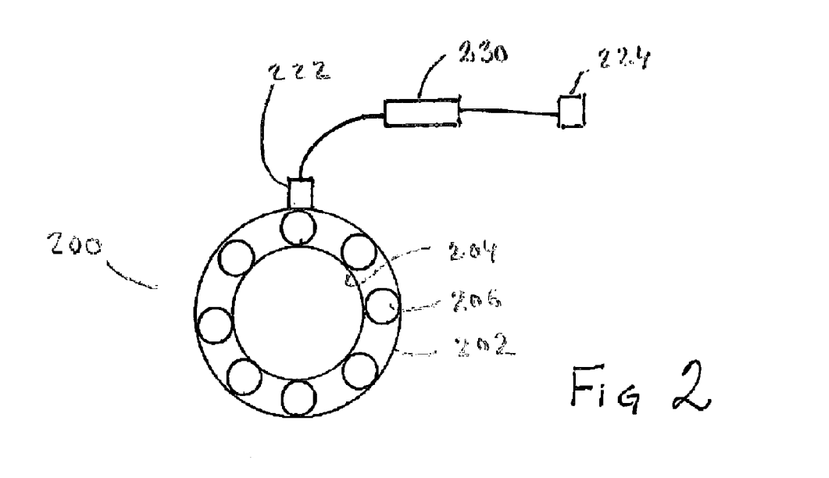
FIG. 2 illustrates an instrumented rolling element bearing according to the invention.

FIG. 2 illustrates an instrumented rolling element bearing 200 according to the invention. The instrumented bearing 200 according to the invention also comprises an outer ring 202, rolling elements 206, an inner ring 204, a sensor unit 222 and a connector 224 to other equipment/units. According to the invention a novel converter 230 is coupled between the sensor unit 222 and the connector 224 to the other equipment/units. The converter 230 converts/transforms the electrical sensor signals from the sensor to electrical signals suitable for whatever the connector 224 is intended to be connected to. In accordance with the example above, according to the invention one type of instrumented bearing needs to be stocked, comprising a sensor unit for speed but without the connector. Depending on customer need a suitable converter that will generate the desired output signals is attached to the sensor unit before delivery. In the example of FIG. 2 the converter 230 is attached to both the sensor unit 222 and the connector 224 by means of a cable.

Figure 3A:
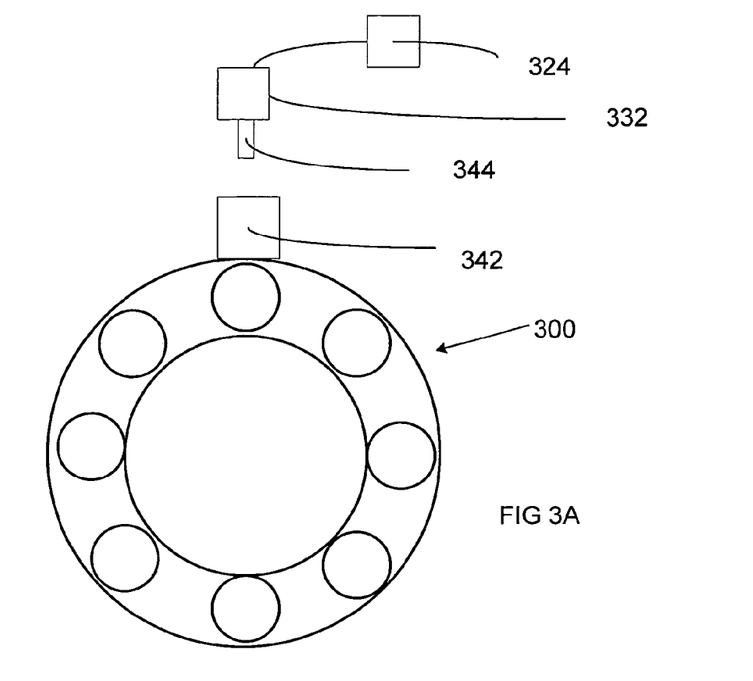
FIG. 3A-3C illustrate further embodiments of instrumented bearings according to the invention.
Figure 3B:
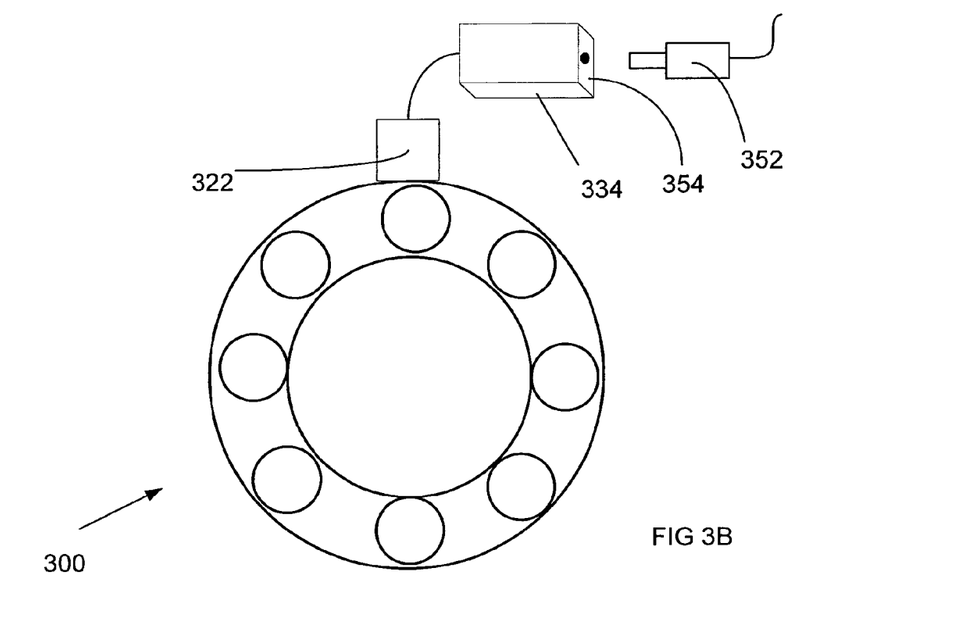
Figure 3C:
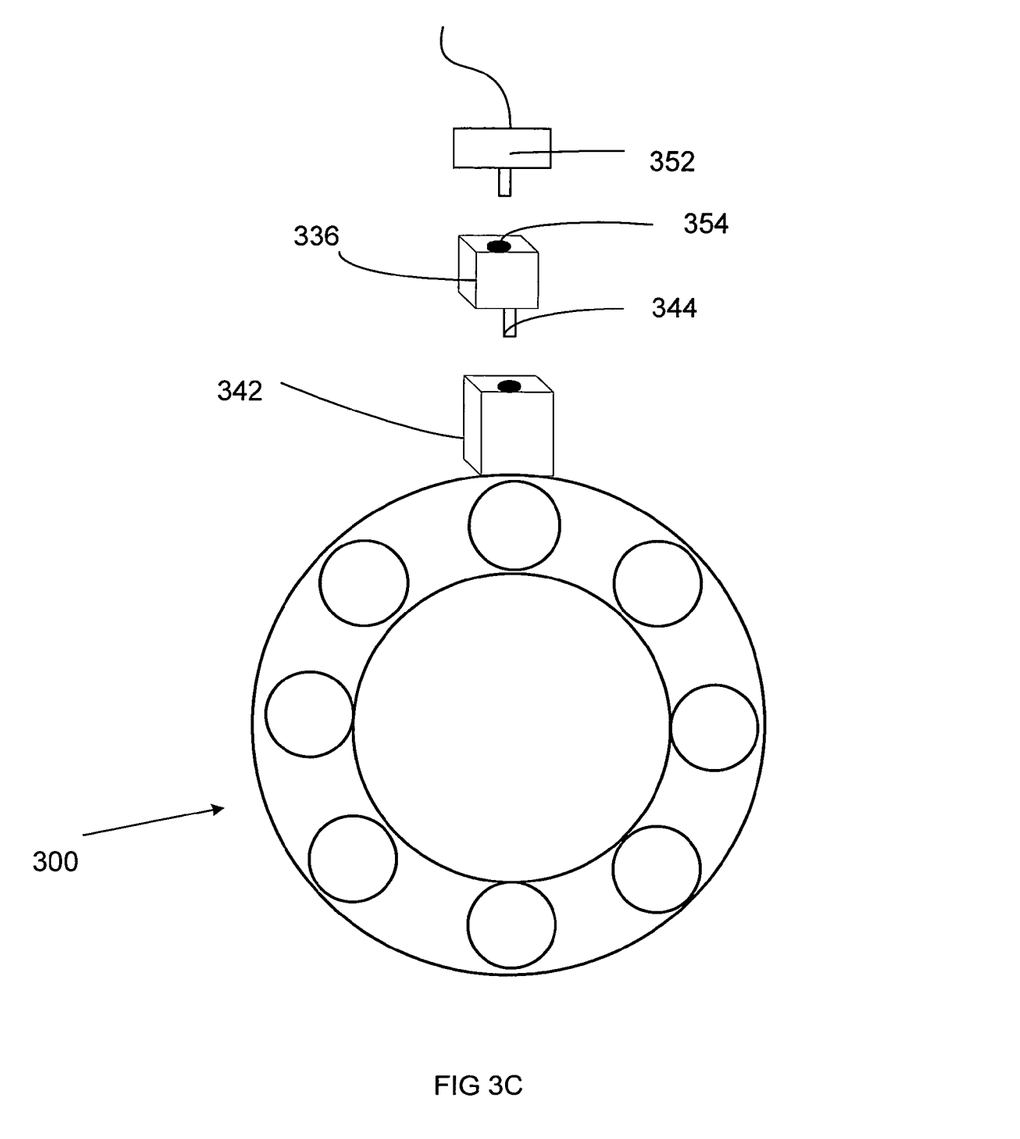

FIGS. 3A, 3B and 3C illustrate further embodiments of instrumented rolling element bearings 300 according to the invention comprising further enhancements. FIG. 3A illustrates a rolling element bearing 300 with a sensor unit 342 with an integrated coded connector according to an alternative embodiment. The coded connector is adapted to cooperate with a coded connector 344 of a converter 332 according to a first alternative embodiment of the invention. As is illustrated in FIG. 3A the coded connector 344 of the converter is integrated with the converter 332. Another version of this embodiment is having the coded connector 344 being coupled with the converter 332 by means of a cable. Also the coded connector of the sensor unit 342 may be extended with a cable.

The coding might take the form of being matching electrical connectors, as in number and shape/size. The coding might also take a form of the connector housing encapsulating the coded connector having different physical sizes and shapes such as round, rectangular, triangular, or heart shaped. In some embodiments there might be a combination of the physical coding as to both connector and housing. As an aid other types of visual coding, such as color, can be used to aid in matching the two ends.

The coding is important to avoid human error in that there will be a match to both ends as to what is at least electrically expected. For example the sensor unit 342 expects to be fed with 12V regulated DC and the converter 332 expects the sensor unit 342 to deliver 5 V pulses as an indication of rotational speed of an attached shaft. Thus the sensor unit 442 coding can for example indicate one or more of what kind of sensor it is, what the output signals are and what type of power requirement, if any, is required. The physical coding of the converter 332 has to match this.

FIG. 3B illustrates using physical coding of a converter unit 334 according to the invention to avoid any human error in coupling the instrumented rolling element bearing 300 to other equipment/units, where the other equipment/units expect and/or require certain input and provide an expected type of power as to levels and quality. In this embodiment the converter 334 comprises a coded connector 354 adapted to cooperate with a matching coded connector 352 which in turn is coupled to other equipment/units. As described above the coding might take the form of being matching electrical connectors, as in number and shape/size. The coding might also take the form of a connector housing encapsulating the coded connector 354 having different physical sizes and shapes such as round, rectangular, triangular, or heart shaped. In some embodiments there might be a combination of the physical coding as to both connector and housing. As an aid other types of visual coding, such as color, can be used to aid matching the two ends.

Also in this embodiment it is important for the converter 334 to know what it can expect to be fed with as to power, for example 12V regulated DC. Likewise it is important that the other equipment/units that are coupled to the matching coded connector 352 receives the expected type and range of electrical signals and delivers the correct power. Thus the coded connector 352 of the converter 334 coding can for example indicate one or more of what kind of output signals will be generated and what type of power, if any, is required. The physical coding of the coded connector 352 of the other equipment/units has to match this. As is illustrated in FIG. 3B the coded connector 354 is integrated with the converter 334. Another version of this embodiment is having the coded connector 354 coupled with the converter 334 by means of a cable.

FIG. 3C illustrates an embodiment essentially combining the embodiments as illustrated in relation to FIGS. 3A and 3B by a converter 336 comprising both a coded connector 344 adapted to cooperate with a matching coded connector of a sensor unit 342, and a coded connector 354 adapted to cooperate with a matching coded connector 352 coupled to other equipment/units. Other versions of this embodiment are either one or both of the coded connector 354 being coupled with the converter 336 by means of a cable and the coded connector 344 being coupled with the converter 336 by means of a cable. Also the coded connector of the sensor unit 342 can be extended with a cable.

Figure 4:
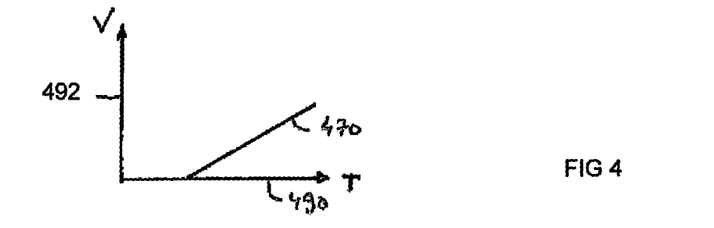
FIG. 4 illustrates an example of an output of a temperature sensor.
Figure 5A:
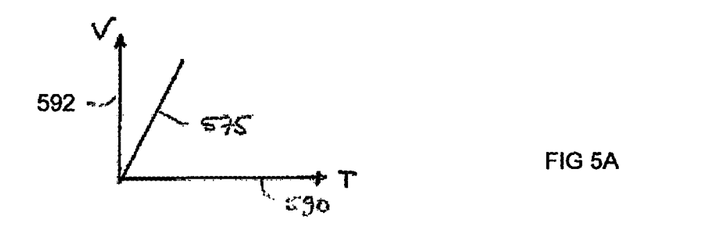
FIG. 5A-5B illustrate examples of different outputs of an instrumented rolling element bearing with a converter according to the invention, instrumented with for example a temperature sensor according to FIG. 4.
Figure 5B:
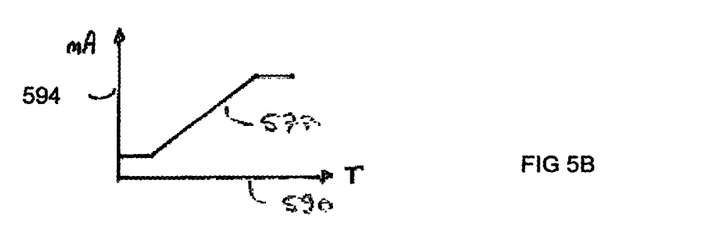

FIG. 4 illustrates an example of an output 470 of a temperature sensor with regard to output voltage 492 in relation to measured temperature 490. As can be seen, the output 470 is linear with an offset. However, the desired output from such a temperature sensor might have a different relationship between temperature and output Voltage, or the desired output might be a standard 4 to 20 mA between some predefined temperatures. FIGS. 5A and 5B illustrate examples of different outputs 575, 577 of an instrumented rolling element bearing according to the invention, instrumented with for example a temperature sensor according to FIG. 4. FIG. 5A illustrates the use of a converter according to the invention that will generate a relationship/curve 575 that is normalized between Volts 592 and temperature 590 with a predetermined slope. FIG. 5B illustrates the use of a converter according to the invention when the desired output is a relationship/curve 577 in the range of 4-20 mA 594 in relation to temperature 590.

Figure 6:
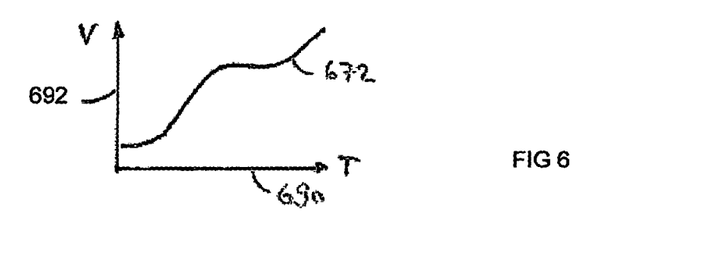
FIG. 6 illustrates an example of an output of a non-linear temperature sensor
Figure 7:
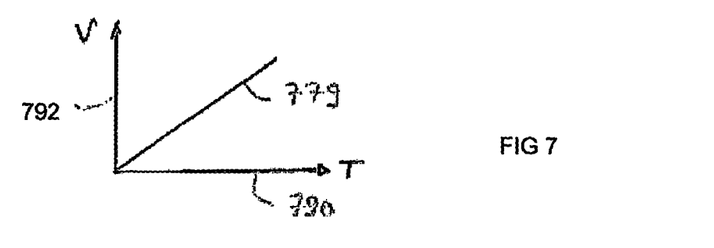
FIG. 7 illustrates an example of a linear output of an instrumented rolling element bearing according to the invention, instrumented with for example a non-linear temperature sensor according to FIG. 6.

As a further example FIG. 6 illustrates a voltage 692 output 672 based on the temperature 690 measured by a non-linear temperature sensor. This is usually not a desired behavior of a temperature sensor and will in most cases only make it practical to use within narrow temperature ranges where the temperature sensor shows some linearity. However, according to the invention, the output of a non-linear sensor can be linearized by means of a converter to a desired output. This can for example be done by a formula or a look-up table. FIG. 7 illustrates an example of a linear voltage 792 output 779 in relation to measured temperature 790 of an instrumented rolling element bearing according to the invention, instrumented with for example a non-linear temperature sensor according to FIG. 6.

Figure 8:
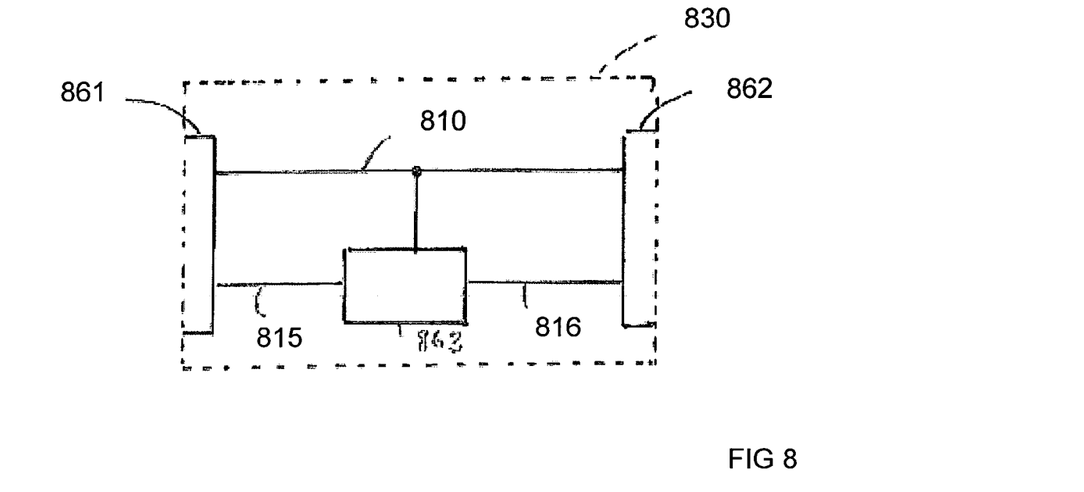
FIG. 8 illustrates a basic example of a block diagram of a dongle according to the invention.

FIG. 8 illustrates a basic example of a block diagram of a converter unit/dongle 830 according to one embodiment of the invention. As is illustrated in FIGS. 2 and 3A to 3C, the converter unit is separated from the sensor unit. There is thus sensor side coupling/connection means 861 to couple the converter unit 830 to the sensor unit. The sensor side connection means 861 can for example be a coded connector as illustrated in FIGS. 3A and 3C, or it can be connecting means for attaching a cable that couples the converter 830 to the sensor unit, as is illustrated in FIGS. 2 and 3B. The sensor side connector means 861 will transfer power 810, as received from the other equipment/units side coupling/connector means 862, to the sensor unit. The sensor side connector means 861 will also transfer sensor signal 815 received from the sensor unit to the converter electronics 863. The converter electronics 863 will convert/transform the sensor signals 815 to converted output signals 816 which are of a type and range that is expected at the other equipment/units side coupling/connector means 862. This can for example comprise transforming an analog sensor signal 815 into a digital output signal 816. In some embodiments it can be simply to change the levels of the analog sensor signal 815 by either dampening them or amplifying them to get a desired output signal 816. Alone or in combination, the converter electronics can also just change the output impedance. The other equipment/units side coupling/connector means 862 will couple/connect an instrumented bearing having a converter unit 830 to other equipment/units such as measurement equipment or condition monitoring equipment.

Figure 9:
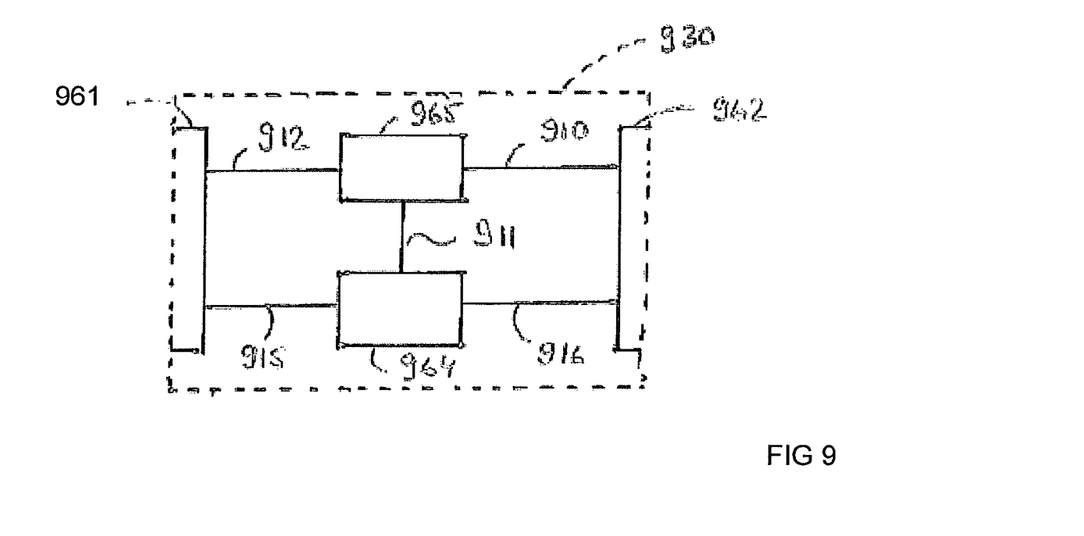
FIG. 9 illustrates a further example of a block diagram of a dongle according to the invention.

FIG. 9 illustrates a further example of a block diagram of a converter unit/dongle 930 according to the invention. This version/embodiment of a converter unit/dongle 930 according to the invention comprises in addition to a sensor side coupling 961, another equipment/unit side coupling 962, converter electronics 964 that will take sensor signal(s) 915 and create converted output signals 916, also a power conditioner/regulator/protector unit 965 that will create conditioned power line(s) 912 from received unconditioned power line(s) 910. The power conditioner/regulator/protector unit 965 can for example have active or passive protection/filtering, and/or have means for up or down conversion, and/or creation of multiple voltages, such as for example creating plus and minus 12 Volts from a 5 Volt input. Suitably there will be an internal power connection 911 to the converter electronics 964 from the power conditioner/regulator/protector unit 965. The specific requirements of both the sensor unit and the application as such and in what environment the instrumented bearing is to operate in will dictate what the power conditioner/regulator/protector unit 965 will comprise. Is the sensor unit sensitive to electrical noise, is the environment for the specific application electrically noisy, what are the poser requirements of the sensor unit, what kind of power can/will the specific application deliver? A big advantage of the invention is the possibility to change the converter unit 930 without having to change the sensor unit/the instrumented bearing as such. This means that if an application turns out to be electrically noisier than what was predicted, then the converter unit 930 can be exchanged with another one with more electrical noise filtering/protection.

Figure 10:
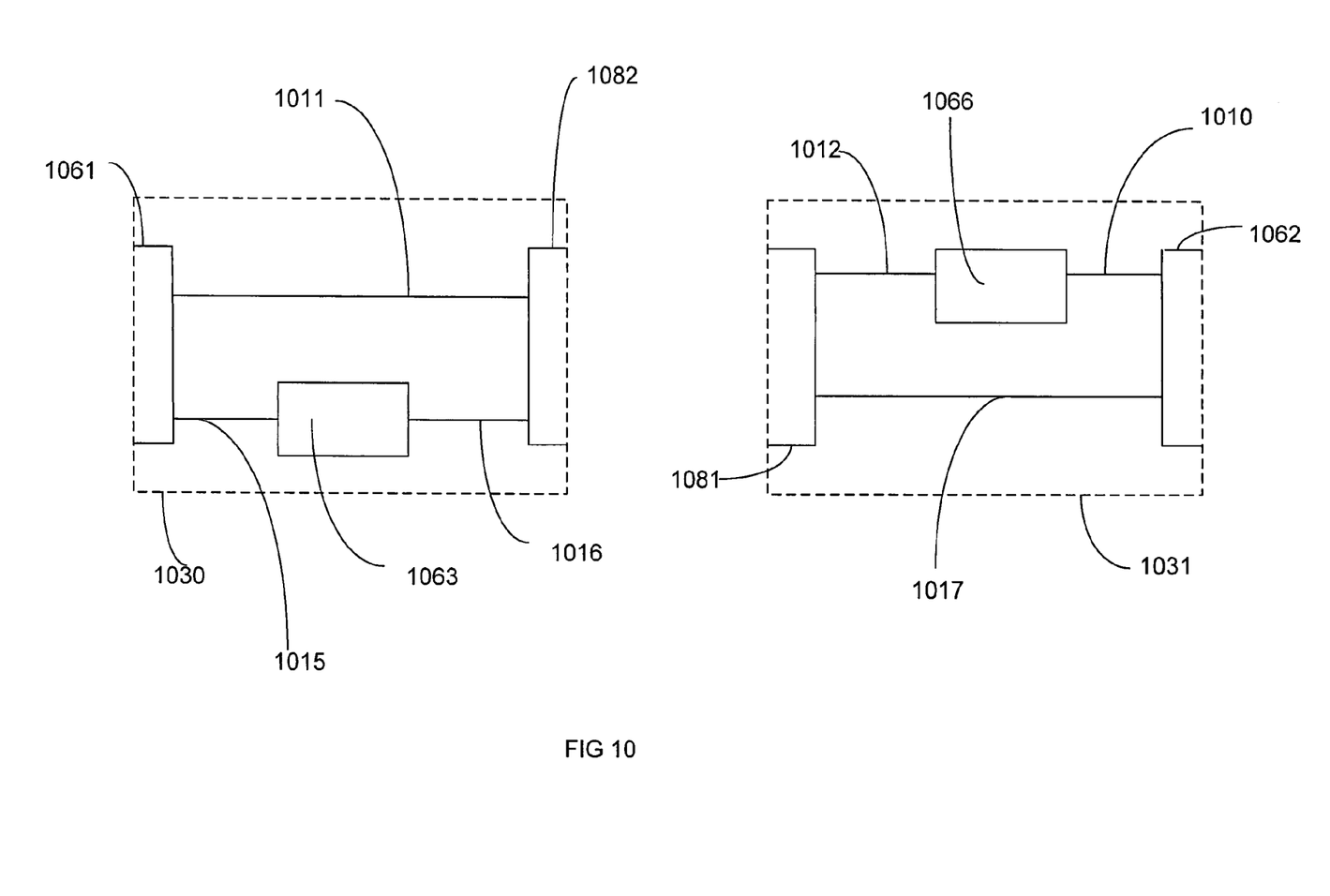
FIG. 10 illustrates a block diagram of a converter unit/dongle and power converter unit/dongle according to the invention.

A further embodiment is attained by separating the converter electronics and the power conditioner/regulator/protector unit into separate enclosures/dongles. FIG. 10 illustrates a block diagram of such an embodiment where the converter electronics and power/conditioner/regulator/protector unit are in separate enclosures/dongles 1030, 1031. The converter unit/dongle 1030 is similar to the converter unit/dongle as described in relation to FIG. 8. There is thus a sensor side coupling/connection means 1061 to couple the converter unit 1030 to a sensor unit. The sensor side connection means 1061 can be a physically coded connector to only match/connect with appropriate sensor units or it can be connecting means for attaching a cable that couples the converter 1030 to the sensor unit. The sensor side connector means 1061 will transfer power 1011 as received from a coupling/connector means 1082 to the sensor unit. The sensor side connector means 1061 will additionally transfer sensor signals 1015 received from the sensor unit to the converter electronics 1063. The converter electronics 1063 will convert/transform the sensor signals 1015 to converted output signals 1016 which are of a type and range that is expected at the other end at the coupling/connector means 1082. This can for example comprise transforming an analog sensor signal 1015 into a digital output signal 1016 or digital to analog. In some embodiments it can be changing the levels of the analog sensor signal 1015 by either dampening the sensor signal 1015, shifting the sensor signal 1015 or amplifying the sensor signal 1015 to get a desired output signal 1016. Alone or in combination, the converter electronics 1063 can also change the output impedance. The coupling/connector means 1082 will allow an instrumented bearing via the converter unit 1030 to be correctly connected/coupled to other equipment/units such as measurement equipment or condition monitoring equipment, or as depicted in FIG. 10, also via a power converter unit/dongle 1031 suitably comprising a power conditioner/regulator/protector 1066. According to one embodiment of the invention the converter unit/dongle 1030 is coupled to the power converter unit/dongle 1031 by means of matching couplings/connectors 1081, 1082. Suitably another equipment/units side coupling/connector 1062 of the power converter unit/dongle 1031 is the same as the other equipment/units side coupling, and/or the same as the coupling to power converter unit/dongle 1082 of the converter unit/dongle 1030. In this type of embodiments the power converter unit/dongle 1031 is optional and can be added if there is a need to condition the supply power available. The power converter unit/dongle 1031 according to the invention comprises in addition to a sensor side coupling and/or converter unit/dongle coupling 1081, and another equipment/unit side coupling 1062, a power conditioner/regulator/protector unit 1066 that will create conditioned power line(s) 1012 from received unconditioned power line(s) 1010. The power conditioner/regulator/protector unit 1066 can for example have active or passive protection/filtering, and/or have means for up or down conversion, and/or creation of multiple voltages, such as for example creating plus 5 Volts from a 12 Volt input. The specific requirements of both the sensor unit and the application as such and in what environment the instrumented bearing is to operate in will dictate what the power conditioner/regulator/protector unit 1066 will comprise. Is the sensor unit sensitive to electrical noise, is the environment for the specific application electrically noisy, what are the poser requirements of the sensor unit, what kind of power can/will the specific application deliver? A big advantage of the invention according to this embodiment is the possibility to change only the power converter unit/dongle 1031 without having to change even the converter unit/dongle 1030. This means that if an application turns out to be electrically noisier than what was predicted, then the power converter unit/dongle 1031 can be added or be exchanged with another one with more electrical noise filtering/protection. The power converter unit/dongle 1031 can also be used without the converter unit 1030, in this case the power converter unit is directly coupled to an instrumented bearing in any manner as previously described. All of the connectors/couplings can be coded as previously described.

The invention is based on the basic inventive idea of one easily interchangeable part, the converter/dongle that adapts an instrumented bearing to many different applications/environments/requirements. The invention is not restricted to the above-described embodiments, but may be varied within the scope of the following claims.

FIG. 1 illustrates an instrumented rolling element bearing:
100 Rolling element bearing,
102 Outer ring,
104 Inner ring,
106 Rolling elements,
120 Sensor arrangement,
122 Sensor unit,
124 Connector to other equipment/units,
126 Cable/conductor between sensor and connector FIG. 2 illustrates an instrumented rolling element bearing according to the invention:
200 Rolling element bearing,
202 Outer ring,
204 Inner ring,
206 Rolling elements,
222 Sensor unit,
224 Connector to other equipment/units,
230 Converter according to the invention comprising a converter converting the electrical sensor signals from the sensor to electrical signals suitable for whatever the connector is intended to be connected to.

FIGS. 3A-3C illustrate further embodiments of instrumented bearings according to the invention:
300 Rolling element bearing,
322 Sensor unit with included cable embodiment, coupled to a converter according to the invention,
324 Connector to other equipment/units,
332 Converter according to a first alternative embodiment, the converter comprising a coded connector adapted to cooperate with a matching coded connector of a sensor unit,
334 Converter according to a second alternative embodiment, the converter comprising a coded connector adapted to cooperate with a matching coded connector coupled to other equipment/units,
336 Converter according to a third alternative embodiment, the converter comprising two coded connectors, one coded connector adapted to cooperate with a matching coded connector of a sensor unit, and one coded connector adapted to cooperate with a matching coded connector coupled to other equipment/units,
342 Sensor unit with integrated coded connector according to an alternative embodiment, the coded connector is adapted to cooperate with a coded connector of a converter according to the invention,
344 Coded connector on a converter according to the invention, the coded connector is adapted to cooperate with a matching coded connector of a sensor unit,
352 Coded connector coupled to other equipment/units, the coded connector is adapted to cooperate with a matching coded connector of a converter,
354 Coded connector on a converted according to the invention, the coded connector is adapted to cooperate with a matching coded connector coupled to other equipment/units.

FIG. 4 illustrates an example of an output of a temperature sensor:
470 Relationship/curve of a sensor output, in Volts for illustration, in relation to temperature,
490 Temperature axis,
492 Sensor output axis in Volts FIGS. 5A-5B illustrate examples of different outputs of an instrumented rolling element bearing according to the invention, instrumented with for example a temperature sensor according to FIG. 4:
575 Relationship/curve of converter output in normalized Volts in relation to temperature,
577 Relationship/curve of converter output in 4-20 mA in relation to temperature, 590 Temperature axis,
592 Converter output axis in Volts
594 Converter output axis in mA.

FIG. 6 illustrates an example of an output of a non-linear temperature sensor:

672 Relationship/curve of sensor output, in Volts, in relation to temperature,
690 Temperature axis,
692 Sensor output axis in Volts FIG. 7 illustrates an example of a linear output of an instrumented rolling element bearing according to the invention, instrumented with for example a non-linear temperature sensor according to FIG. 6:

779 Relationship/curve of converter output in linearized Volts in relation to temperature,
790 Temperature axis,
792 Converter output axis in Volts FIG. 8 illustrates a basic example of a block diagram of a converter unit/dongle according to the invention:

810 Power line(s),
815 Sensor signal(s)
816 Converted output signals
830 Converter according to one embodiment of the invention
861 Sensor side coupling
862 Other equipment/units side coupling
863 Converter electronics FIG. 9 illustrates a further example of a block diagram of a converter unit/dongle according to the invention:

910 Unconditioned power line(s)
911 Power to the converter electronics
912 Conditioned power line(s)
915 Sensor signal(s)
916 Converted output signals
930 Converter according to a further embodiment of the invention,
961 Sensor side coupling
962 Other equipment/units side coupling
964 Converter electronics
965 Power conditioner/regulator/protector FIG. 10 illustrates a block diagram of a converter unit/dongle and power converter unit/dongle according to the invention:

1010 Unconditioned power line(s)
1011 Power line(s),
1012 Conditioned power line(s)
1015 Sensor signal(s)
1016 Converted output signals
1017 Sensor signal(s) pass through
1030 Converter unit/dongle according to the invention
1031 Power Converter unit/dongle according to the invention
1061 Sensor side coupling
1062 Other equipment/units side coupling
1063 Converter electronics
1066 Power conditioner/regulator/protector
1081 Either sensor side coupling and/or converter unit/dongle coupling
1082 Either other equipment/units side coupling, and/or coupling to power converter unit/dongle.

The invention claimed is:

1. A sensor bearing assembly comprising:
a rolling element bearing comprising an inner ring, an outer ring, and rolling elements arranged between the inner ring and the outer ring;
at least one sensor arranged to convert one or more physical magnitudes to electrical sensor signals, the sensor being attached directly or indirectly to the rolling element bearing, wherein the assembly further includes:
a converter unit arranged to convert the electrical sensor signals to output signals, the output signals being different in form, type and/or amplitude in relation to the electrical sensor signals,
wherein the converter unit is enclosed in an enclosure separate from the sensor,
wherein the converter unit is electrically coupled to the sensor by means of matching coded detachable connectors being a sensor side coded connector and a converter unit input side coded connector,
wherein the converter unit is further electrically coupled to the sensor by means of an electrical cable between the sensor and the sensor side coded connector, and/or between the converter unit and the converter unit input side coded connector,
wherein the converter unit input side coded connector is integrated with the enclosure of the converter unit,
wherein the converter unit is electrically coupled to other equipment by means of matching coded detachable connectors being a second equipment side coded connector and a converter unit output side coded connector,
wherein the converter unit is further electrically coupled to the other equipment by means of an electrical cable between the second equipment and other equipment side coded connector, and/or between the converter unit and the converter unit output side coded connector, and
wherein the converter unit output side coded connector is integrated with the enclosure of the converter unit.

2. The sensor bearing assembly according to claim 1, wherein the converter unit is electrically coupled to the sensor by means of an electrical cable.

3. The sensor bearing assembly according to claim 1, wherein the converter unit is electrically coupled with other equipment by means of an electrical cable.

4. The sensor bearing assembly according to claim 1, wherein the converter unit further comprises power supply conditioning means.

5. The sensor bearing assembly according to claim 4, wherein the conditioning means comprises power supply conversion and/or electrical interference filtering means.

6. The sensor bearing assembly according to claim 1, wherein a converter of the converter unit converts analog sensor signals to digital output signals, or converts digital sensor signals to analog output signals.

7. The sensor bearing assembly according to claim 1, wherein a converter of the converter unit linearizes the sensor signals.

8. The sensor bearing assembly according to claim 7, wherein the linearization is done by means of a transfer function and/or a look-up table.

* * * * *